Dec. 22, 1931.  C. B. DUFFEY ET AL  1,837,535
EVISCERATING AND INSPECTION PAN
Filed Dec. 30, 1929
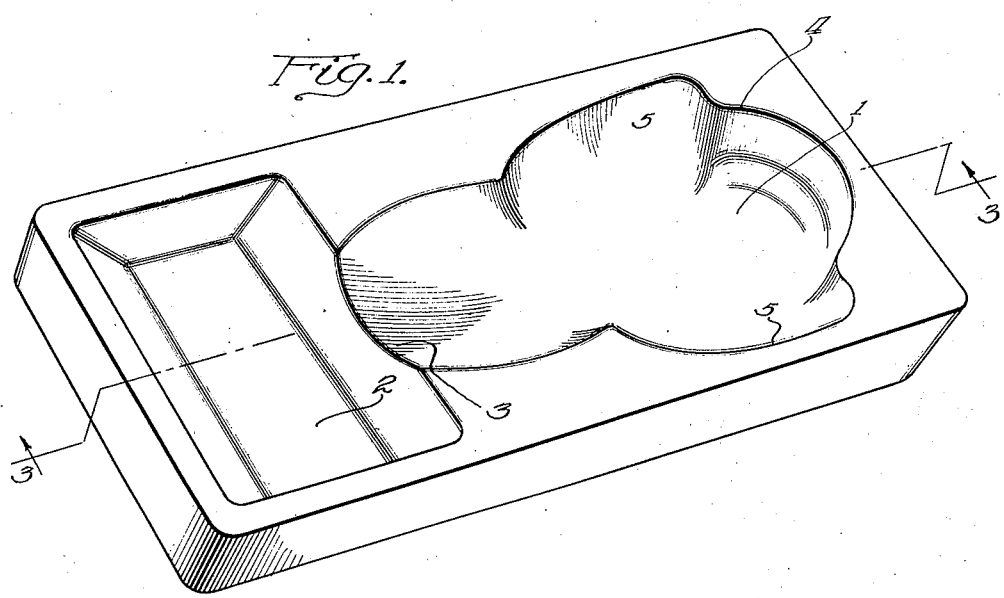
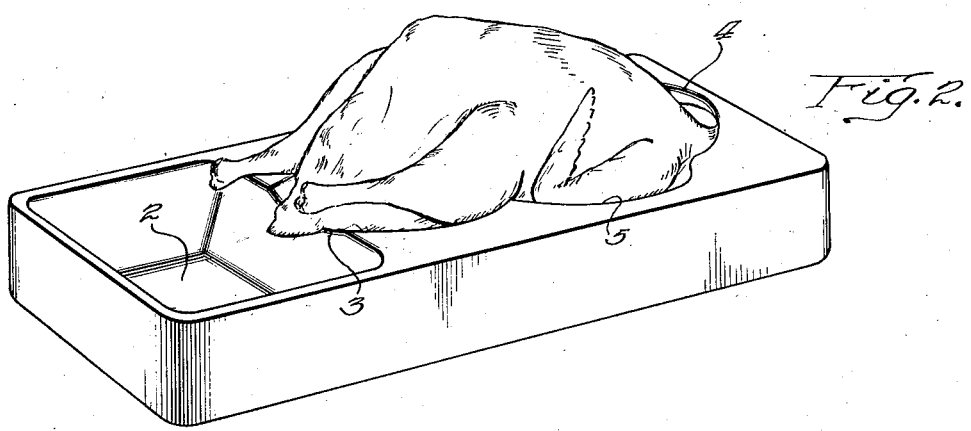
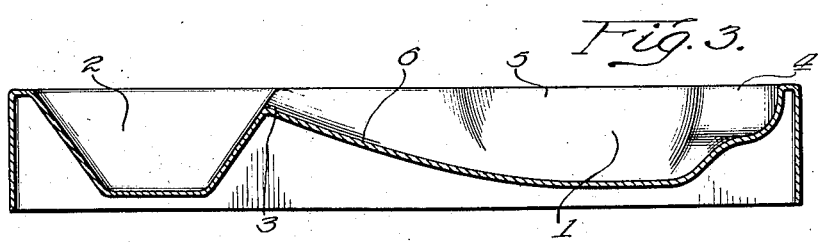

Patented Dec. 22, 1931

1,837,535

UNITED STATES PATENT OFFICE

CHESTER B. DUFFEY AND JOHN Z. WADE, OF CHICAGO, ILLINOIS, ASSIGNORS, BY MESNE ASSIGNMENTS, TO INDUSTRIAL PATENTS CORPORATION, OF CHICAGO, ILLINOIS, A CORPORATION OF DELAWARE

EVISCERATING AND INSPECTION PAN

Application filed December 30, 1929. Serial No. 417,550.

Our invention relates to an eviscerating and inspection means particularly designed to facilitate the inspection of the viscera of poultry. The main objects of our invention are to provide an improved form of eviscerating and inspection pan; to provide such a pan having a compartment for holding the viscera of a single fowl and having means for supporting the carcass of the fowl adjacent such compartment; and to provide a pan having two compartments, in one of which the carcass of the fowl to be inspected may rest firmly, and in the other the viscera may be inspected.

In the preparation of dressed poultry for market, the birds are first slaughtered and picked. It then becomes necessary to inspect each individual fowl in order to cull out and destroy diseased poultry. To permit inspection, it is necessary that the viscera be removed for examination. An operator opens the carcass and removes the viscera, which are then examined by an inspector, after which another operator separates the edible organs, namely, the heart, liver and gizzard from the inedible viscera. The gall bladder is removed from the liver and the lungs separated from the heart and the gizzard. These edible parts are then cleaned and reinserted in the carcass of the fowl.

Our invention provides a convenient means for inspecting eviscerated carcasses, by providing a pan which permits inspecting and working upon the viscera without soiling or contaminating the carcass with visceral fluids or substances, and providing a means whereby the fowl to be condemned may be identified with certainty, if, upon inspection of the viscera, the inspector condemns the fowl.

A specific embodiment of this invention is illustrated in the accompanying drawings, in which Figure 1 is a top view in perspective.

Figure 2 is a view similar to Figure 1, with a carcass in position to be opened for removal of the viscera.

Figure 3 is a lengthwise cross-section midway between the two sides, showing the contours at that point.

In the form shown, the pan or tray is designed for the inspection of one fowl at a time.

The fowl is placed breast side up in compartment 1, with the posterior or tail end directed toward compartment 2 into which the viscera may be readily deposited as they are withdrawn from the carcass. Compartment 1 is shaped to accommodate and fit the carcass of a fowl of the particular species and grade to be inspected and the sides of this compartment are shaped and sloped in suitable fashion to fit birds of a considerable range in size. This compartment is asymmetrical at the portion 4 at which the anterior or head end of the fowl rests, in order to accommodate the neck and head when bent sidewise around and against the body. Concavities 5 at each side accommodate the wings and the bottom wall slopes upwardly and rearwardly at 6 so as to elevate the tail of the fowl so that it will lie well above the contents of the other compartment 2.

Compartment 2 is oblong in shape at the top and bottom, being in a pan designed for chickens approximately 6" x 4" at the top, and 5" x 2" at the bottom, the corners being rounded and the sides sloping inward from the top to the bottom, in order to provide a depression without sharp corners that may be easily cleaned and sterilized, and that will properly exhibit the viscera for inspection. We find that the convenient size of pan for use for chickens is one which is 7" wide x 14½" long x 2¼" in height. The compartments are joined at 3 by a short embrasure-like passage which accommodates the tail structure of the fowl.

The fowl to be inspected is placed in compartment 1 so as to be firmly held breast upward and tail elevated, as in Figure 2. The abdomen is then slit open in the usual manner and the contents of the abdominal cavity and chest are withdrawn and spread out in the broad bottom of compartment 2 and inspected. The gall bladder is then carefully removed from the liver, and the edible organs such as the liver, heart and gizzard, are cleaned and returned to the inside of the bird.

Although but one specific embodiment of this invention has been herein shown and described, it is understood that various details in construction and various details in method may be altered or omitted without departing from the spirit of this invention as defined by the following claims.

We claim:

1. An eviscerating and inspection pan having a compartment shaped to support and conform to the carcass of an edible animal, breast upward, and an adjacent separate compartment to accommodate the viscera after removal from the carcass, the bottom of the carcass receiving compartment sloping upwardly to the top portion of the viscera receiving compartment to elevate one end of the carcass above the viscera receiving compartment.

2. An eviscerating and inspection device comprising a shallow compartment for exposing the drawn viscera of a fowl, and means conforming to the back and sides of a fowl for supporting the same breast upward at one side of said compartment, the bottom of the carcass receiving compartment sloping upwardly to the top portion of the viscera receiving compartment to elevate one end of the carcass above the viscera receiving compartment.

3. A supporting device for use in the eviscerating and inspection of animal carcasses, comprising a supporting structure formed to provide a plurality of depressions for supporting a carcass and parts thereof, one of said depressions being shaped to conform to the back and sides of such carcass to form a seat for the latter, one end of the carcass receiving depression extending upwardly to the top portion of the other depression to elevate one end of the carcass adjacent the said other depression.

4. A supporting device for use in the eviscerating and inspection of carcasses, comprising a supporting structure having adjacent depressions in its upper surface, one of said depressions being shaped to conform to the back and sides of a carcass, and an embrasure formed in said body structure between adjacent depressions.

5. An eviscerating and inspection device comprising a supporting structure having a plurality of depressions in its upper surface, one of the depressions extending upwardly to the top portion of the other depression to elevate an end of the carcass above the said other depression and having means at the sides for engaging and interfitting with the sides and back of a particular type of carcass to secure said carcass against slippage, and to hold it breast upward for an eviscerating operation and inspection.

6. An eviscerating and inspection device comprising a supporting structure having a viscera receiving depression and provided with a carcass receiving depression extending upwardly to a point adjacent the top portion of one of the walls of the viscera receiving depression to elevate the tail of the fowl above the said viscera receiving depression, said carcass receiving depression being provided at opposite sides with means for engaging the wings of a carcass and having an asymmetrical portion arranged to receive the head and neck of a fowl when the said head and neck are bent sidewise around the body, said supporting structure having a flat surface at opposite sides of the carcass receiving depression.

7. An eviscerating and inspection device comprising a supporting structure having a plurality of depressions in its upper surface, one of the depressions being relatively deep and adapted to receive the viscera of a fowl and another of the depressions arranged adjacent to the viscera receiving depression and shaped to conform to the back of a carcass, the bottom of the carcass receiving depression sloping upwardly to the top portion of the viscera receiving depression to elevate one end of the carcass above and adjacent the top of the viscera receiving depression.

8. An eviscerating and inspection device comprising a shallow compartment for exposing the drawn viscera of a fowl, and means conforming to the back and sides of a fowl and forming a seat for securely supporting the same breast upward, said seat extending upwardly to the top portion of the viscera receiving compartment so as to support the carcass in an elevated position at one side of said compartment.

Signed at Chicago this 24th day of December, 1929.

CHESTER B. DUFFEY.
JOHN Z. WADE.